United States Patent
Mossman et al.

(10) Patent No.: US 10,660,272 B2
(45) Date of Patent: May 26, 2020

(54) DRAPER BELT TENSIONER WITH WORM AND SECTOR GEAR

(71) Applicant: Deere & Company, Moline, IL (US)

(72) Inventors: Michael W. Mossman, Silvis, IL (US); Jesse R. Neely, Annawan, IL (US)

(73) Assignee: DEERE & COMPANY, Moline, IL (US)

( * ) Notice: Subject to any disclaimer, the term of this patent is extended or adjusted under 35 U.S.C. 154(b) by 0 days.

(21) Appl. No.: 16/011,255

(22) Filed: Jun. 18, 2018

(65) Prior Publication Data

US 2019/0380273 A1    Dec. 19, 2019

(51) Int. Cl.
*A01D 61/00*    (2006.01)
*A01D 57/20*    (2006.01)
*B65G 23/44*    (2006.01)

(52) U.S. Cl.
CPC .......... *A01D 61/002* (2013.01); *A01D 57/20* (2013.01); *B65G 23/44* (2013.01)

(58) Field of Classification Search
CPC ...... B65G 23/44; B65G 39/16; A01D 61/002; A01D 57/20; A01D 61/02; A01D 34/04; A01D 34/14; A01D 41/14
See application file for complete search history.

(56) References Cited

U.S. PATENT DOCUMENTS

| | | | | |
|---|---|---|---|---|
| 284,723 A * | 9/1883 | Colahan | ................. | B65G 23/44 198/813 |
| 808,122 A * | 12/1905 | Tanck | ................. | B65G 23/44 198/816 |
| 1,347,121 A * | 7/1920 | Rice | ................. | B65G 23/44 198/813 |
| 2,631,421 A * | 3/1953 | Pierce | ................. | A01D 57/20 56/14.4 |
| 2,635,736 A | 4/1953 | Rust | | |
| 4,421,228 A * | 12/1983 | Marsiglio | ................. | B65G 23/44 198/814 |
| 5,030,173 A * | 7/1991 | Bryant | ................. | B65G 23/44 474/136 |
| 6,202,397 B1 | 3/2001 | Watts et al. | | |
| 6,298,981 B1 * | 10/2001 | Hosch | ................. | B65G 23/44 198/812 |
| 6,685,009 B1 * | 2/2004 | Hosch | ................. | B65G 23/44 198/813 |
| 6,752,261 B1 * | 6/2004 | Gaeddert | ............. | B65G 21/105 193/35 TE |

(Continued)

OTHER PUBLICATIONS

European Search Report issued in counterpart European Patent Application No. 19180296.6 dated Nov. 6, 2019 (5 pages).

*Primary Examiner* — Arpad Fabian-Kovacs
(74) *Attorney, Agent, or Firm* — Foley & Lardner LLP

(57) ABSTRACT

A draper platform includes a drive roller and an idler roller spaced from the drive roller. A belt is operatively coupled to each of the drive roller and the idler roller. The draper platform also includes a belt tensioning system, including a tension adjustment rod. A worm gear is operatively coupled to the tension adjustment rod. A sector gear is in meshed engagement with the worm gear. A push rod is operatively coupled to each of the sector gear and the idler roller such that rotation of the sector gear causes translation of the idler roller so as to adjust tension of the belt.

20 Claims, 2 Drawing Sheets

(56) References Cited

U.S. PATENT DOCUMENTS

| | | | |
|---|---|---|---|
| 7,322,462 B2* | 1/2008 | Landry | B65G 23/44 |
| | | | 198/812 |
| 7,448,491 B1 | 11/2008 | Tippery et al. | |
| 7,827,775 B2* | 11/2010 | Sethi | A01D 57/20 |
| | | | 56/314 |
| 7,874,132 B2* | 1/2011 | Sauerwein | A01D 41/141 |
| | | | 56/10.2 E |
| 7,877,976 B2* | 2/2011 | Honas | A01D 57/20 |
| | | | 56/208 |
| 7,886,511 B2* | 2/2011 | Honas | A01D 57/20 |
| | | | 56/181 |
| 7,886,512 B2* | 2/2011 | Lohrentz | A01D 57/20 |
| | | | 56/181 |
| 7,958,711 B1* | 6/2011 | Sauerwein | A01D 57/20 |
| | | | 56/181 |
| 8,065,865 B1 | 11/2011 | Dow et al. | |
| 8,281,561 B2 | 10/2012 | Dow et al. | |
| 8,495,855 B1 | 7/2013 | Conrad et al. | |
| 8,544,250 B2 | 10/2013 | Lovett et al. | |
| 8,573,388 B2 | 11/2013 | Hoffman et al. | |
| 8,695,315 B2 | 4/2014 | Coon et al. | |
| 8,752,359 B2 | 6/2014 | Cormier et al. | |
| 10,257,981 B2* | 4/2019 | Allochis | A01D 57/20 |
| 10,264,728 B2* | 4/2019 | Brimeyer | A01D 61/02 |
| 2007/0193243 A1* | 8/2007 | Schmidt | A01D 41/14 |
| | | | 56/181 |
| 2008/0276590 A1* | 11/2008 | Sauerwein | A01D 41/14 |
| | | | 56/153 |
| 2008/0296131 A1 | 12/2008 | Tippery et al. | |
| 2009/0288383 A1 | 11/2009 | Sauerwein et al. | |
| 2013/0097986 A1 | 4/2013 | Lovett et al. | |
| 2013/0105282 A1* | 5/2013 | Hoffman | A01D 41/14 |
| | | | 198/814 |

* cited by examiner

DRAPER BELT TENSIONER WITH WORM AND SECTOR GEAR

TECHNICAL FIELD

The present disclosure relates generally to tensioning systems for draper headers.

BACKGROUND

An agricultural harvester such as a combine includes a header designed for harvesting particular crops. The header cuts a wide swath of crop and conveys the cut crop to a central feeder house for threshing. Grain headers typically utilize an auger or a belt system to convey the cut crop to the central feeder house. Headers that utilize belts are referred to as draper headers, and the draper header frame and belt mechanism can be referred to as a draper platform. Draper platforms typically include a center belt and at least one side belt on each side of the draper header. The side belts convey the cut crop to the center belt, which conveys the cut crop to the central feeder house.

SUMMARY

Various example embodiments relate to draper platforms. An example draper platform includes a drive roller and an idler roller spaced from the drive roller. A belt is operatively coupled to each of the drive roller and the idler roller. The draper platform also includes a belt tensioning system, including a tension adjustment rod. A worm gear is operatively coupled to the tension adjustment rod. A sector gear is in meshed engagement with the worm gear. A push rod is operatively coupled to each of the sector gear and the idler roller such that rotation of the sector gear causes translation of the idler roller so as to adjust tension of the belt.

Another example draper platform, according to an alternative embodiment, includes a front frame assembly, which includes a float arm and slide brackets that are fixedly coupled to each end of the float arm. An equalizer bar is slidably coupled to the side brackets. Bearing brackets are fixedly coupled to each end of the equalizer bar. Each of the bearing brackets includes a front bearing. A rear frame assembly includes rear, first side, and second side members that are fixedly coupled to each other so as to define a U-shaped structure. An interior member fixedly is coupled to at least one of the rear, first side, and second side members in an interior portion of the U-shaped structure. A rear bearing is positioned in each of the first and second side members. The front and rear frame assemblies are pivotally coupled to each other at a pivot point proximate a midpoint of the float arm and a midpoint of the interior member. An idler roller is operatively coupled to the front bearings so as to rotatably couple the idler roller to the front frame assembly along a central axis of the idler roller. A drive roller is operatively coupled to the rear bearings so as to rotatably couple the drive roller to the rear frame assembly along a central axis of the drive roller. A tensioning system includes a worm gear in meshed engagement with a sector gear. Rotation of the sector gear by the worm gear causes translational movement of the idler roller relative to the drive roller.

Various other embodiments relate to draper belt tensioning systems. An example draper belt tensioning system includes a tension adjustment rod. A worm gear is operatively coupled to the tension adjustment rod. A sector gear is in meshed engagement with the worm gear. A push rod is operatively coupled to each of the sector gear and an idler roller such that rotation of the sector gear causes translation of the idler roller so as to adjust tension of a belt extending around the idler roller and a drive roller.

This summary is illustrative only and is not intended to be in any way limiting. Other aspects, inventive features, and advantages of the devices and/or processes described herein, as defined solely by the claims, will become apparent in the detailed description set forth herein, taken in conjunction with the accompanying figures, wherein like reference numerals refer to like elements.

BRIEF DESCRIPTION OF THE DRAWINGS

Exemplary embodiments will become more fully understood from the following detailed description, taken in conjunction with the accompanying drawings, wherein like reference numerals refer to like elements.

DETAILED DESCRIPTION

Before turning to the figures, which illustrate the exemplary embodiments in detail, it should be understood that the present disclosure is not limited to the details or methodology set forth in the description or illustrated in the figures. It should also be understood that the terminology used herein is for the purpose of description only and should not be regarded as limiting.

Some embodiments, of systems and methods described herein provide advantages over draper platforms that have a center feed system that has two rollers that stay relatively parallel to each other and a push rod that is controlled by a tensioning system that allows equal pressure on the equalizer bar controlling the drive roller. Such draper platforms often use a bolt and push rod to a bell crank. The relatively small size of the threads causes galling and binding of the threads, thereby making adjustment occasionally difficult.

Figure 1:
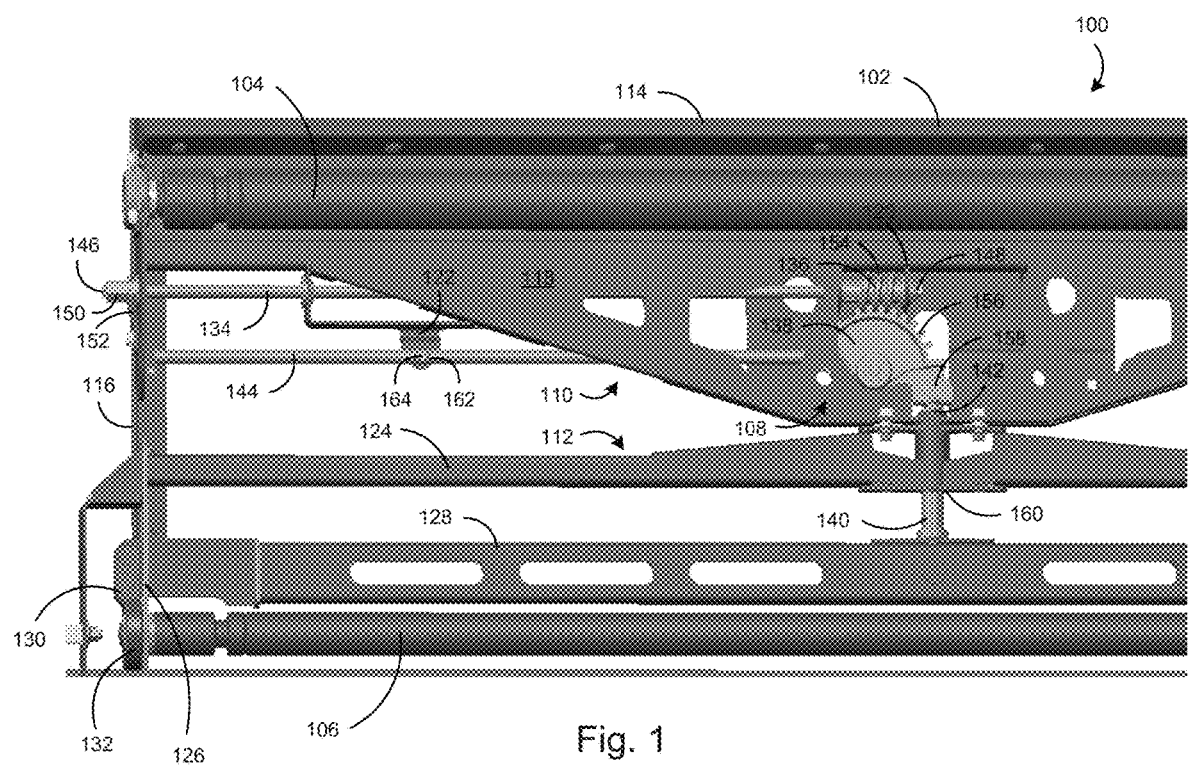
FIG. 1 is a plan view schematic drawing of a draper platform, according to some embodiments.

Systems and methods of using a worm sector gear arrangement with bushing in the pivots allow for quicker, more robust arrangement to tension the equalizer bar in some embodiments. In some embodiments, a spring is provided in the push bar link to maintain tension and allow dampening of the idler roller due to belt vitiations. FIG. 1 is a plan view of a draper platform 100, according to some embodiments. The draper platform 100 of FIG. 1 is a center draper platform to support and operate a center belt (not shown) of a draper header. The draper platform 100 includes a frame 102, a drive roller 104, an idler roller 106, and a tensioning system 108. A draper belt extends around the drive roller 104 and the idler roller 106. The tensioning system 108 provides a force against the idler roller 106 to urge the idler roller 106 away from the drive roller 104 so as to provide a desired tension on the belt.

As will be appreciated, the tensioning system 108 of FIG. 1 utilizes a worm and sector gear mechanism, which provides advantages over a bell crank mechanism in some embodiments. As discussed in further detail below, the tensioning system 108 of FIG. 1 provides various technical advantages.

The frame 102 includes a rear frame assembly 110 and a front frame assembly 112. The rear frame assembly 110 is pivotally coupled to the front frame assembly 112. In some implementations, the sickle bar (not shown) in front of the idler roller 106 floats relative to the ground. The pivotal coupling between the rear and front frame assemblies 110, 112 enables the idler roller 106 to track movement of the sickle bar, while the drive roller 104 maintains a constant position relative to the feed drum of the feeder house (not shown).

The rear frame assembly 110 includes a rear member 114, a first side member 116, a second side member (not shown), and an internal member 118. The first side member 116 and the second side member are each fixedly coupled to the rear member 114 so as to form a U-shaped frame. The drive roller 104 is operatively coupled to the rear frame assembly 110 proximate the rear member 114. More specifically, the drive roller 104 extends between and is rotatably coupled to the first side member 116 and the second side member.

The internal member 118 is fixedly coupled to at least one of the rear member 114, the first side member 116, and the second side member at an interior portion of the rear frame assembly 110. It should be understood that the internal member 118 may include one or more discrete parts. For example, as illustrated in FIG. 1, the internal member 118 includes a top plate that partially covers the tension adjustment rod 134, the sector gear 138, and the tension indicator rod 144. In an embodiment, the top plate of the internal member 118 supports the belt to prevent the belt from interfering with operation of the worm gear 136 and the sector gear 138. The internal member 118 can include various other plates and brackets. For example, the internal member 118 can include a bottom plate for the same purposes as the top plate. The The internal member 118 also includes various brackets for supporting various components of the tensioning system 108. For example, the internal member 118 includes a first support bracket 120 and a second support bracket 122, which are discussed in further detail below in connection with the components that they support. It should be understood that, according to various embodiments, the internal member 118 or any other parts of the frame 102 may include additional or fewer brackets than shown in FIG. 1. For example, in FIG. 1, the top plate of the internal member 118 covers a third bracket positioned proximate the end of the worm gear teeth 154 opposite the first support bracket 120.

The front frame assembly 112 includes a float arm 124, slide brackets 126, an equalizer bar 128, and bearing brackets 130. The slide brackets 126 are fixedly coupled to each end of the float arm 124. The bearing brackets 130 are fixedly coupled to each end of the equalizer bar 128. The bearing brackets 130 each include a bearing 132. The idler roller 106 is supported at each end by the bearings 132 so as to rotatably couple the idler roller 106 to the front frame assembly 112 along a central axis of the idler roller 106. The idler roller 106 is fixedly coupled to the front frame assembly 112 with respect to non-rotational movement (e.g., translation). In other words, the idler roller 106 maintains a constant relative position (other than rotation) relative to the equalizer bar 128.

The tensioning system 108 includes a tension adjustment rod 134, a worm gear 136, a sector gear 138, a push rod 140, a damping system 142, and a tension indicator rod 144. In general, belt tension is adjusted by rotating the tension adjustment rod 134, which rotates the worm gear 136. This in turn causes rotation of the sector gear 138, which extends the push rod 140. The push rod 140 engages the equalizer bar 128 to move the equalizer bar forward, thereby increasing belt tension.

The tension adjustment rod 134 extends between a first end 146 and a second end 148. The first end 146 extends through an aperture in the first side member 116 of the rear frame assembly 110. An input block 150 is fixedly coupled to the first end 146. The input block 150 is structured to receive a torque input from a user to rotate the tension adjustment rod 134 so as to adjust the belt tension. In one embodiment, the input block 150 is hexagonally shaped for engagement by a wrench. It should be appreciated that the input block 150 may comprise other shapes suitable for engagement by a tool to provide torque to the input block 150. A lockout 152 is removably coupled to an outer surface of the first side member 116 via a bolt. The lockout 152 is a fork-shaped member sized and shaped to securely engage input block 150 so as to lock the position of the input block 150 relative to the first side member 116 so as to maintain constant tension on the belt during operation. In order to adjust belt tension, the bolt of the lockout 152 is loosened to allow the lockout 152 to be disengaged from the input block 150. The input block 150 can then be rotated to adjust belt tension. The tension adjustment rod 134 is supported on the rear frame assembly 110 via the first and second support brackets 120, 122. The first and second support brackets 120, 122 define apertures through which the tension adjustment rod 134 extends. For example, as illustrated in FIG. 1, the tension adjustment rod 134 extends through an aperture in the first support bracket 120, which is positioned proximate the sector gear 138 and the second end 148 of the tension adjustment rod 134. The tension adjustment rod 134 also extends through an aperture in the second support bracket 124, which is positioned between the first side member 116 and the sector gear 138 and also between the first and second ends 146, 148 of the tension adjustment rod 134. In some embodiments, the first and second brackets include bushings or bearings to reduce rotational friction between the tension adjustment rod 134 and the respective first and second support brackets 120, 122.

The worm gear 136 is coupled to the tension adjustment rod 134 proximate the second end 148. In some embodiments, the worm gear 136 is formed integrally with the tension adjustment rod 134. In other embodiments, the worm gear 136 is otherwise fixedly coupled to the tension adjustment rod 134. The worm gear 136 defines worm gear teeth 154, which are formed as a continuous coarse screw thread that revolves around the tension adjustment rod 134.

The sector gear 138 is pivotally coupled to the internal member 118 of the rear frame assembly 110. The sector gear 138 includes sector gear teeth 156 and an arm 158. The sector gear teeth 156 are formed along an arc on a portion of a periphery of the sector gear 138. The sector gear teeth 156 are in meshed engagement with the worm gear teeth 154 so as transmit torque from the worm gear 136 to the sector gear 138. The arm 158 is formed integrally with the sector gear 138 and extends radially outward relative to the sector gear teeth 156.

The push rod 140 is pivotally coupled to each of the arm 158 of the sector gear 138 and to the equalizer bar 128. The push rod 140 extends through a cylindrical sleeve 160 defined by the float arm 124 of the front frame assembly 112. The push rod 140 transmits force from the arm 158 to the equalizer bar 128. It is important to note that there is only one pivot point between the push rod 140 and the equalizer bar 128, and that the pivot point is positioned at the midpoint of the equalizer bar 128 along its length. This configuration ensures that force applied to the equalizer bar 128 is distributed uniformly along the length of the equalizer bar 128 and, therefore, is distributed evenly along the idler roller 106. This further ensures that uniform belt tension is applied across the entire belt.

The damping system 142 is operatively coupled to the push rod 140. The damping system 142 is structured to attenuate force and vibration imparted on the equalizer bar 128 from operation of the belt. The damping system 142 is discussed in further detail in connection with FIG. 2.

The tension indicator rod 144 is pivotally coupled to the sector gear 138 and extends therefrom through an aperture in the first side member 116 of the rear frame assembly 110. The tension indicator rod 144 is structured to provide a visual indication of belt tension. For example, in one embodiment, the tension indicator rod 144 is structured for lateral movement along a central axis of the tension indicator rod 144. In such embodiments, a scale is provided on a distal end of the tension indicator rod 144 that provides a visual indication of belt tension according to the length of the distal end of the tension indicator rod 144 extending past an outer surface of the first side member 116. In another embodiment, the tension indicator rod 144 is structured for fore/aft movement perpendicular to the central axis of the tension indicator rod 144. In such embodiments, a scale is provided on a the outer surface of the first side member 116 that provides a visual indication of belt tension according to the position of the distal end of the tension indicator rod 144 relative to the scale.

The tension indicator rod 144 may be supported on the rear frame assembly 110 in one or more locations. For example, as illustrated in FIG. 1, the tension indicator rod 144 defines a slot 162 structured to receive a pin 164 extending from the second support bracket 124. In this arrangement, the second bracket 122 supports the tension indicator rod 144 in a vertical direction (into and out of the page). The slot 162 and the pin 164 support the tension indicator rod 144 in a fore/aft direction (up and down on the page), while permitting limited movement in a lateral direction (left and right on the page). It should be understood that the draper platform 100 may include various types of support features, such as brackets, apertures, guides, etc.

Figure 2:
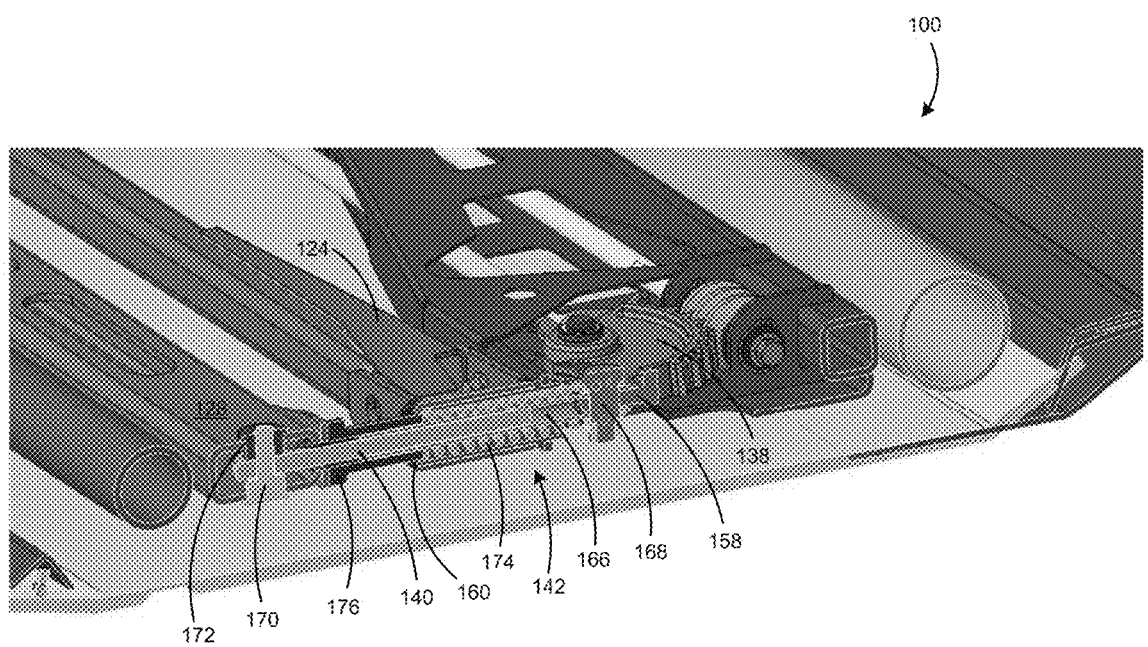
FIG. 2 is a partial cross-sectional perspective view schematic drawing of the draper platform illustrated in FIG. 1, according to some embodiments.

FIG. 2 is a partial cross-sectional perspective view of the draper platform 100 of FIG. 1, with the section taken through a central axis of the push rod 140. In particular, FIG. 2 illustrates in further detail the push rod 140 and the mechanisms by which the push rod 140 is coupled to the sector gear 138 and the equalizer bar 128.

As shown in FIG. 2, a yoke 166 is pivotally coupled to the arm 158 of the sector gear 138 via a shoulder bolt 168. The shoulder bolt 168 effectively operates as a bushing, because the nut tightens against the shoulder of the shoulder bolt 168 rather than a component to which it is attached. The yoke 166 is generally shaped as a hollow cylinder with an aperture at one end to receive the arm 158 and the shoulder bolt 168. The yoke 166 extends from the arm 158 into the sleeve 160 of the float arm 124.

The push rod 140 is pivotally coupled to the equalizer bar 128 via a shoulder bolt 170 and a bushing 172. The push rod 140 also extends from the equalizer bar 128 into sleeve 160 of the float arm 124. More specifically, the push rod 140 extends into the interior portion of the yoke 166 within the sleeve 160. The interior portion of the yoke 166 effectively defines an additional sleeve for slidably receiving the push rod 140.

The damping system 142, according to one embodiment, includes a spring 174 and a spacer 176. The spring 174 is positioned at least partially within the sleeve 160. The yoke 166 and the push rod 140 extend into an interior portion of the spring 174. The spring 174 has a first end that abuts the shoulder bolt 168 proximate the sector gear 138 and a second end that abuts the spacer 176. In some embodiments, the damping system 142 also includes a damper or dashpot (e.g., a hydraulic or gas damper) that resists motion via viscous friction.

The spacer 176 is positioned between the equalizer bar 128 and the second end of the spring 174. In one embodiment, the spacer 176 is a hat bushing. The spacer 176 has a first end that abuts the equalizer bar 128 and a second end that abuts the second end of the spring 174. The first end of the spacer 176 defines a flange that provides increased surface area against the equalizer bar 128. The second end has a diameter that is similar to that of the spring 174 so that the spacer 176 can enter the sleeve 160 of the float arm 124 when the spring 174 is compressed. The spacer 176 is generally shaped as a hollow cylinder, such that both the yoke 166 and the push rod 140 extend at least partially through an interior portion of the spacer 176. More specifically, the yoke 166 is received within the interior portion of the spacer 176 and the push rod 140 is received within the interior portion of the yoke 166 within the interior portion of the spacer 176.

As noted above, the tensioning system 108 of FIGS. 1 and 2 with a worm and sector gear mechanism provides various technical advantages over the conventional tensioning systems which utilize a bell crank mechanism in some embodiments.

For example, some conventional tensioning systems have exhibited problems adjusting, holding, and releasing tension. One root cause of these problems is that the threaded connection between the tension bar and the adjustment bolt utilized to adjust belt tension can degrade or fail with use. The threads of the tension bar and the adjustment bolt are continuously under tension. Additionally, the threads are relatively fine threads for the amount of loading to which they are subjected. In some implementations, simply increasing the size and strength of the threads of the tension bar and the adjustment bolt is infeasible due to space constraints, material cost, and part weight. In operation, over-tightening, under-tightening, excessive vibration, and other factors can cause the threaded connection to loosen over time, thereby degrading the ability of the conventional tensioning system to maintain a desired tension over time. Additionally, the threads of the tension bar and/or the adjustment bolt may become galled, which can impair the ability to apply or release tension.

The tensioning system 108 of FIGS. 1 and 2 can be configured to reduce or eliminate the need for the threaded connection between the tension bar and the adjustment bolt of conventional bell crank tensioning systems in some embodiments. Bell crank tensioning systems require this type of threaded connection because bell cranks are actuated by pushing or pulling a link coupled to the bell crank, which is achieved by changing the effective length of the tension bar by adjusting the depth of the threaded connection between the tension bar and the adjustment bolt. In contrast, the worm gear 136 of some embodiments of the tensioning system 108 is continuously adjustable by only rotating the tension adjustment rod 134, which advances the sector gear 138 via the continuous screw thread of the worm gear 136. In contrast, bell crank tensioning systems, which are actuated via translational movement, require a rotational input so as to effectuate translation via the threaded connection.

There are various technical advantages that result from this design feature of the tensioning system 108. For example, the instant tensioning system 108 reduces part count and eliminates a known failure mode by requiring a single adjustment rod versus a two-piece adjustment rod with a threaded connection.

Another technical advantage is that the threads of the worm gear 136 are much coarser—and therefore more robust—than the threads of the threaded connection utilized in bell crank tensioning systems.

Another technical problem with some conventional tensioning systems is that the pivot joints of the tensioning system can degrade over time due to excessive loading. In some conventional tensioning systems, force and vibration applied to the idler roller is transmitted through at least four separate links and even more pivot joints before it is attenuated by a spring. Over time, the pivot joints can loosen or even fail, thereby degrading or completely preventing the tensioning system from maintaining adequate belt tension.

In contrast, in some embodiments of the tensioning system 108, the damping system 142 is directly adjacent the part that is subject to the forces and vibrations that the damping system 142 is designed to attenuate. There are several technical advantages to this arrangement. For example, the damping system 142 provides much more localized damping and attenuation than the spring of some conventional systems, which is decoupled from the source of the forces and vibrations via several different links and joints. This enables improved performance, reduced response time, and less mechanical loading on components.

As utilized herein, the terms "approximately," "about," "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the disclosure as recited in the appended claims.

It should be noted that the term "exemplary" and variations thereof, as used herein to describe various embodiments, are intended to indicate that such embodiments are possible examples, representations, and/or illustrations of possible embodiments (and such terms are not intended to connote that such embodiments are necessarily extraordinary or superlative examples).

The term "coupled," as used herein, means the joining of two members directly or indirectly to one another. Such joining may be stationary (e.g., permanent or fixed) or moveable (e.g., removable or releasable). Such joining may be achieved with the two members coupled directly to each other, with the two members coupled to each other using a separate intervening member and any additional intermediate members coupled with one another, or with the two members coupled to each other using an intervening member that is integrally formed as a single unitary body with one of the two members. Such members may be coupled mechanically, electrically, and/or fluidly.

The term "or," as used herein, is used in its inclusive sense (and not in its exclusive sense) so that when used to connect a list of elements, the term "or" means one, some, or all of the elements in the list. Conjunctive language such as the phrase "at least one of X, Y, and Z," unless specifically stated otherwise, is understood to convey that an element may be either X, Y, Z; X and Y; X and Z; Y and Z; or X, Y, and Z (i.e., any combination of X, Y, and Z). Thus, such conjunctive language is not generally intended to imply that certain embodiments require at least one of X, at least one of Y, and at least one of Z to each be present, unless otherwise indicated.

References herein to the positions of elements (e.g., "top," "bottom," "above," "below," etc.) are merely used to describe the orientation of various elements in the FIGURES. It should be noted that the orientation of various elements may differ according to other exemplary embodiments, and that such variations are intended to be encompassed by the present disclosure.

What is claimed is:

1. A draper platform, comprising:
   a drive roller;
   an idler roller spaced from the drive roller;
   a belt operatively coupled to each of the drive roller and the idler roller; and
   a belt tensioning system, comprising:
      a tension adjustment rod,
      a worm gear operatively coupled to the tension adjustment rod,
      a sector gear in meshed engagement with the worm gear, and
      a push rod operatively coupled to each of the sector gear and the idler roller such that rotation of the sector gear causes translation of the idler roller so as to adjust tension of the belt;
      wherein the sector gear rotates about an axis that is not parallel with the tension adjustment rod.

2. The draper platform of claim 1, wherein the tension adjustment rod extends between a first end and a second end, the worm gear operatively coupled to the tension adjustment rod proximate the first end, the belt tensioning system further comprising:
   an input block fixedly coupled to the tension adjustment rod proximate the second end, the input block structured to receive a torque input to adjust the tension of the belt,
   wherein the torque input provided to the input block causes rotation of the tension adjustment rod and the worm gear, the rotation of the worm gear causing the rotation of the sector gear via the meshed engagement therebetween so as to adjust tension of the belt.

3. The draper platform of claim 2, further comprising a rear frame assembly, the rear frame assembly comprising:
   a rear member, comprising a first end and a second end,
   a first side member fixedly coupled to the first end of the rear member, and
   a second side member fixedly coupled to the second end of the rear member, the drive roller rotatably coupled to each of the first and second side members proximate the rear member.

4. The draper platform of claim 3,
   wherein the tension adjustment rod extends from an interior portion of the rear frame assembly and through an aperture of the first side member,
   wherein the input block is positioned in an exterior portion of the rear frame assembly opposite the interior portion.

5. The draper platform of claim 4, further comprising a lockout removably coupled to an exterior surface of the first side member, the lockout comprising a fork-shaped member structured to securely engage the input block so as to prevent the rotation of the tension adjustment rod, wherein the lockout is decoupled from the exterior surface of the first side member so as to adjust the tension of the belt.

6. The draper platform of claim 3, wherein the belt tensioning system further comprises a tension indicator rod, the tension indicator rod pivotally coupled to the sector gear, the tension indicator rod extending through a second aperture of the first side member, and the tension indicator rod structured to provide a visual indication of belt tension based on a position of a distal end of the tension indicator rod relative to an exterior surface of the first side member.

7. The draper platform of claim 1, further comprising a front frame assembly, the front frame assembly comprising:
   an equalizer bar extending between a first end and a second end; and
   first and second bearing brackets fixedly coupled to each of the respective first and second ends of the equalizer bar, each of the first and second bearing brackets comprising a bearing,
   wherein the idler roller is operatively coupled to the bearings of the respective first and second bearing brackets, and
   wherein the push rod is pivotally coupled to the equalizer bar such that the push rod is operatively coupled to the idler roller via the equalizer bar.

8. The draper platform of claim 7, wherein the belt tensioning system further comprises a damping system comprising a spring operatively coupled to the sector gear and the equalizer bar so as to urge the idler roller away from the drive roller.

9. A draper platform, comprising:
   a front frame assembly, comprising:
      a float arm,
      slide brackets fixedly coupled to each end of the float arm,
      an equalizer bar slidably coupled to the slide brackets, and
      bearing brackets fixedly coupled to each end of the equalizer bar, each of the bearing brackets comprising a front bearing;
   a rear frame assembly, comprising:
      rear, first side, and second side members fixedly coupled to each other so as to define a U-shaped structure,
      an interior member fixedly coupled to at least one of the rear, first side, and second side members in an interior portion of the U-shaped structure, and
      a rear bearing positioned in each of the first and second side members,
      wherein the front and rear frame assemblies are pivotally coupled to each other at a pivot point proximate a midpoint of the float arm and a midpoint of the interior member;
   an idler roller operatively coupled to the front bearings so as to rotatably couple the idler roller to the front frame assembly along a central axis of the idler roller;
   a drive roller operatively coupled to each of the rear bearings so as to rotatably couple the drive roller to the rear frame assembly along a central axis of the drive roller; and
   a tensioning system comprising a worm gear in meshed engagement with a sector gear,
   wherein rotation of the sector gear by the worm gear causes translational movement of the idler roller relative to the drive roller;
   wherein the sector gear rotates about an axis that is not parallel with the worm gear.

10. The draper platform of claim 9, further comprising a belt extending around the idler roller and the drive roller, wherein the translational movement of the idler roller relative to the drive roller changes tension on the belt.

11. The draper platform of claim 10,
   wherein the float arm defines a sleeve extending therethrough proximate the midpoint of the sleeve,
   wherein the tensioning system further comprises:
      a yoke pivotally coupled to an arm of the sector gear via a shoulder bolt, the yoke extending into the sleeve,
      a pushrod pivotally coupled to the equalizer bar, the pushrod extending into an interior portion of the yoke within the sleeve,
      a spring comprising a first end and a second end, the first end abutting the shoulder bolt, and
      a spacer comprising third and fourth ends, the third end of the spacer abutting the equalizer bar and the fourth end of the spacer abutting the spring, and
   wherein the rotation of the sector gear adjusts a force applied to the equalizer bar via the spring and the spacer, thereby adjusting tension of the belt.

12. The draper platform of claim 11,
   wherein the third end of the spacer comprises a flange so as to increase a surface area of the spacer against the equalizer bar, and
   wherein the fourth end of the spacer has a diameter similar to a diameter of the spring so that the spacer is structured to compress the spring.

13. The draper platform of claim 11, wherein the fourth end of the spacer extends into the sleeve upon the spacer providing sufficient compression of the spring.

14. The draper platform of claim 11, wherein the tensioning system further comprises damping system including the spring and a hydraulic damper.

15. The draper platform of claim 9, wherein the idler roller is fixedly coupled to the front frame assembly with respect to non-rotational movement such that the idler roller maintains a constant non-rotational position relative to the equalizer bar.

16. A draper belt tensioning system, comprising:
   a tension adjustment rod;
   a worm gear operatively coupled to the tension adjustment rod;
   a sector gear in meshed engagement with the worm gear; and
   a push rod operatively coupled to each of the sector gear and an idler roller such that rotation of the sector gear causes translation of the idler roller so as to adjust tension of a belt extending around the idler roller and a drive roller;
   wherein the sector gear rotates about an axis that is not parallel with the tension adjustment rod.

17. The draper belt tensioning system of claim 16, wherein the tension adjustment rod extends between a first end and a second end, the worm gear operatively coupled to the tension adjustment rod proximate the first end, the draper belt tensioning system further comprising:
   an input block fixedly coupled to the tension adjustment rod proximate the second end, the input block structured to receive a torque input to adjust the tension of the belt,
   wherein the torque input provided to the input block causes the rotation of the tension adjustment rod and the worm gear, the rotation of the worm gear causing rotation of the sector gear via the meshed engagement therebetween so as to adjust tension of the belt.

18. The draper belt tensioning system of claim 17, further comprising a lockout structured to be removably coupled to a surface, the lockout comprising a fork-shaped member structured to securely engage the input block so as to prevent the rotation of the tension adjustment rod, wherein the lockout is decoupled from the surface so as to adjust the tension of the belt.

19. The draper belt tensioning system of claim 17, further comprising a tension indicator rod, the tension indicator rod pivotally coupled to the sector gear, the tension indicator rod structured to provide a visual indication of belt tension based on a position of a distal end of the tension indicator rod relative to a surface.

20. The draper belt tensioning system of claim 17, further comprising a damping system comprising a spring operatively coupled to the sector gear and the idler roller so as to urge the idler roller away from the drive roller.

\* \* \* \* \*